(12) United States Patent
Mayell et al.

(10) Patent No.: US 10,931,203 B2
(45) Date of Patent: Feb. 23, 2021

(54) SYNCHRONIZING MULTIPLE CONTROLLERS IN A POWER CONVERTER

(71) Applicant: POWER INTEGRATIONS, INC., San Jose, CA (US)

(72) Inventors: Robert J. Mayell, Los Altos, CA (US); Yueming Wang, Gilroy, CA (US); Roger Colbeck, Ottawa (CA); Hartley Fred Horwitz, Ottawa (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 16/687,400

(22) Filed: Nov. 18, 2019

(65) Prior Publication Data

US 2020/0195149 A1 Jun. 18, 2020

Related U.S. Application Data

(60) Provisional application No. 62/779,289, filed on Dec. 13, 2018.

(51) Int. Cl.
*H02M 3/335* (2006.01)
*H02M 3/158* (2006.01)
*G06F 1/12* (2006.01)

(52) U.S. Cl.
CPC .......... *H02M 3/33507* (2013.01); *G06F 1/12* (2013.01); *H02M 3/1584* (2013.01); *H02M 2003/1586* (2013.01)

(58) Field of Classification Search
CPC .......... H02M 3/33507; H02M 3/1584; H02M 2003/1586; H02M 1/36;
(Continued)

(56) References Cited

U.S. PATENT DOCUMENTS 8,842,449 B1 9/2014 Tong
10,554,136 B1 * 2/2020 Miletic ............. H02M 3/33515
(Continued)

OTHER PUBLICATIONS

"AN-6104 LLC Resonant Converter Design using FAN7688," Fairchild Semiconductor Corporation, 2015, 23 pages.
(Continued)

*Primary Examiner* — Adolf D Berhane
*Assistant Examiner* — Afework S Demisse
(74) *Attorney, Agent, or Firm* — Christensen O'Connor Johnson Kindness PLLC

(57) ABSTRACT

A controller configured for use in a power converter includes a multiplexer that receives a startup clock signal and a request clock signal. The multiplexer selects the startup signal or the request clock signal to generate a clock signal. A startup clock generates the startup clock signal to control a switching frequency of a primary switching circuit during a startup condition. A request clock generates the request clock signal in response to a request signal to control the switching frequency of the primary switching circuit after the startup condition. A control circuit receives the clock signal to generate a drive signal control the switching frequency of the primary switching circuit. The control circuit selects the startup clock signal during the startup condition. The control circuit receives an indication in the request signal of an end of an undervoltage condition and then selects the request clock signal after the startup condition.

27 Claims, 7 Drawing Sheets

(58) Field of Classification Search
CPC ..... H02M 2001/0058; H02M 3/33569; H02M 3/33546; G06F 1/12
See application file for complete search history.

(56) References Cited

U.S. PATENT DOCUMENTS

2016/0352237 A1* 12/2016 Quigley ............ H02M 3/33523
2019/0252985 A1* 8/2019 Radic ................ H02M 3/33515

OTHER PUBLICATIONS

"TEA19161T Digital Controller for High-Efficiency Resonant Power Supply," Rev. 1, Mar. 10, 2016, Product Data Sheet, NXP Semiconductors, 46 pages.

* cited by examiner

SYNCHRONIZING MULTIPLE CONTROLLERS IN A POWER CONVERTER

CROSS-REFERENCE TO RELATED APPLICATIONS

This application claims the benefit of U.S. Provisional Application No. 62/779,289 filed on Dec. 13, 2018, the contents of which are incorporated herein by reference in their entirety.

FIELD OF THE DISCLOSURE

The present invention relates generally to power converters, and more specifically to switched mode power converters.

BACKGROUND INFORMATION

Field of the Disclosure

The present invention relates generally to power converters, and more specifically to switched mode power converters.

Background

Electronic devices use power to operate. Switched mode power converters are commonly used due to their high efficiency, small size, and low weight to power may of today's electronics. Conventional wall sockets provide a high voltage alternating current (ac). In a switching power converter, the high voltage ac input is converted to provide a well-regulated direct current (dc) output through an energy transfer element. The switched mode power converter usually provides output regulation by sensing one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter. Varying the duty cycle may be referred to as pulse width modulation (PWM) control, while varying the switching frequency may be referred to as pulse frequency modulation (PFM) control.

One type of switched mode power converter topology is a resonant switched mode power converter, which utilizes a resonant inductance-capacitance (LC) circuit as part of the power conversion process. In general, resonant switched mode power converters with PFM control may have some advantages compared to non-resonant converters, such as operating at higher switching frequencies with lower switching loss, utilizing smaller magnetic elements (and therefore utilizing smaller packaging), all while operating with high efficiency. Resonant power converters generally do not have waveforms with sharp edges (e.g., waveforms without having high di/dt or dv/dt) and as such electromagnetic interference (EMI) performance may be improved, which allows the use of smaller EMI filters as compared to non-resonant converters.

LLC converters are a type of resonant switched mode power converter, which utilizes the resonance between two inductors and a capacitor. LLC converters are popular due to the savings on cost and size by utilizing the magnetizing and leakage inductance of the power converter's energy transfer element as part of the resonance component of the LLC converter. In addition, LLC converters can achieve zero voltage switching, which can result in lower switching losses.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
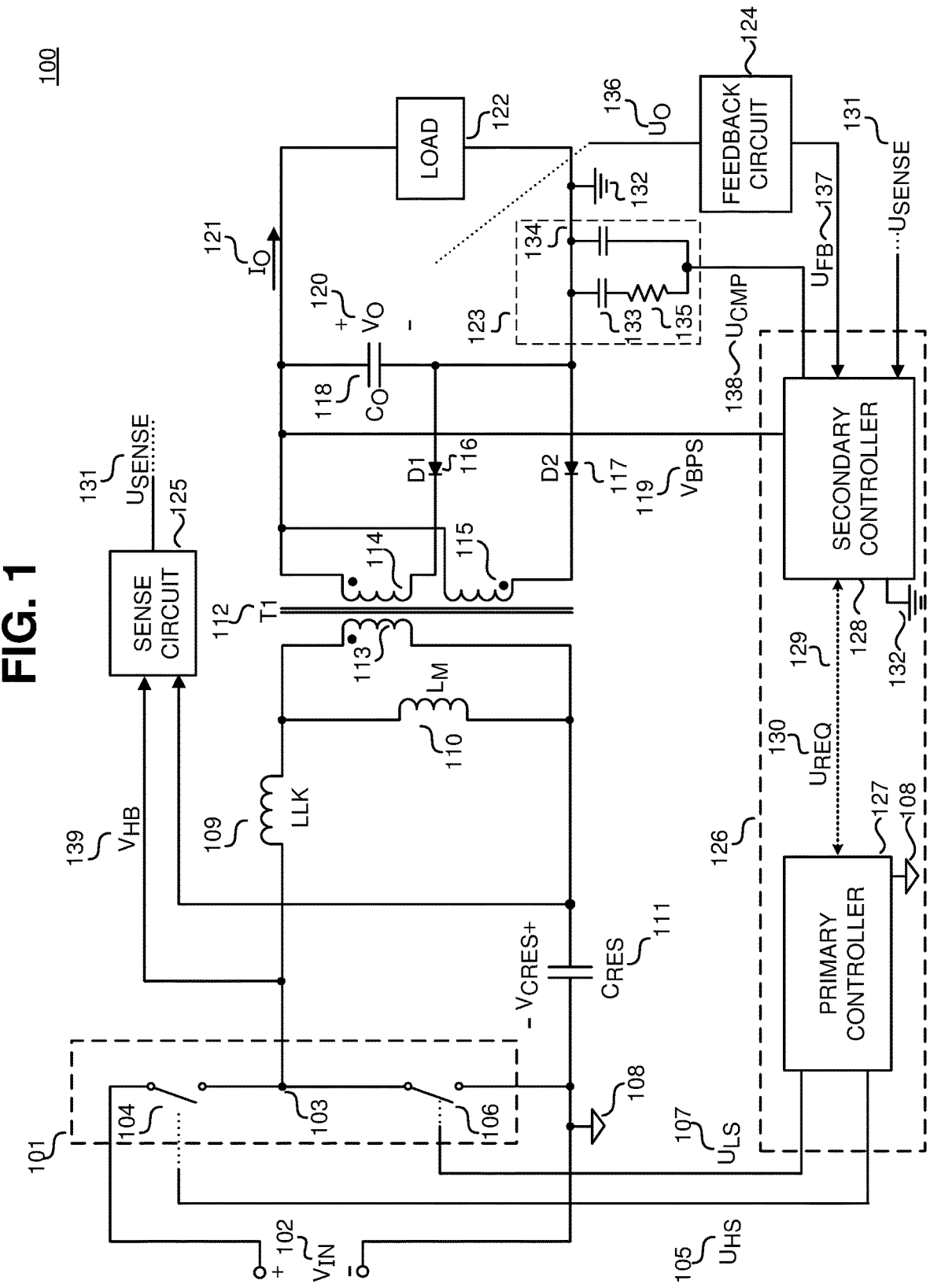
FIG. 1 is a functional block diagram illustrating one example of a resonant power converter with a power converter controller including a primary controller and a secondary controller in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a resonant switched mode power converter in which the control of generating the switching frequency of the switching circuit is split between the primary side and the secondary side of the power converter are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Resonant converters, such as LLC converters, typically include a resonant tank circuit that includes tank inductance and a tank capacitance, as found for instance in LLC circuits. Resonant converters may take advantage of soft switching control to provide output voltage without the associated high switching losses, high switching stress on the power switch, and high EMI caused by fast switching edges.

Soft switching the power switch of an LLC converter may also enable zero voltage switching (ZVS) in which the voltage across the power switch is substantially zero before the power switch is turned ON which may reduce the switching losses for the LLC converter. For the example of a half-bridge LLC converter, two power switches (referred to as a high side switch and a low side switch in a half bridge switching circuit) of a switching circuit are used to control the transfer of energy from the input of the power converter to the output of the power converter. The power switches are controlled such that one power switch is turned OFF before the other power switch is turned ON, and the two power switches are generally controlled to be ON for substantially equal amounts of time under steady-state conditions. In general, a switch that is ON (or closed), may conduct current, while a switch that is OFF (or open) does not typically conduct current. In one example, the first switch is ON while the second switch is OFF. The first switch is turned OFF with a non-zero current. After the first switch turns OFF and before the second switch turns ON, the voltage across the second switch will typically reduce.

ZVS switching generally refers to turning ON the second switch with a non-zero current as the voltage across the second switch reaches near-zero. Using this type of switching prevents energy loss from discharge of the capacitance across the terminals of the switch during switch turn-on. To achieve ZVS, the power switches are controlled such that there is a period of time, referred to as "dead time," where both power switches are OFF prior to one of the power switches turning ON. Further, in one example during the "dead time" period when both switches are OFF, the voltage across one of the power switches may be reduced to zero and once at zero volts, this switch could be turned ON with minimal switching loss (achieving ZVS).

In other words, soft switching may refer to turning on either the high side switch or the low side switch when there is non-zero tank current in the resonant tank circuit of an LLC converter (and minimum voltage across the switch being turned ON). Hard switching generally refers to turning on the high side switch or the low side switch when the tank current is substantially zero (and concurrent voltage across the switch is non-zero on the switch being turned ON). When the high side switch and low side switches are hard switching, ZVS is not possible and higher switching losses occur. Under certain conditions, there may be substantially zero tank current in the resonant tank circuit. In one example (of hard switching), the tank current is zero when both the high side switch and the low side switch have been turned off for a long enough period of time that there is no tank current. In another example (of hard switching), a load increase at the output of the power converter could lead to a depletion of the tank current. As the load increases, the resonant converter can enter into an "overload condition" and too much energy is temporarily taken from the resonant tank circuit and the tank current falls to zero.

As will be discussed, examples in accordance with the teachings of the present invention disclose an LLC converter in which the generation of the switching frequency of the power switches is split between the primary and secondary LLC controllers. In so doing, the generation of the switching frequency for the power converter is transitioned smoothly between the primary side and secondary side with minimal disturbance, which reduces hard switching and output voltage ripple while allowing successful startup into a variety of loads. In one example, the primary controller can detect when the secondary controller is ready to take over generating the switching frequency, such as when the secondary controller is no longer in an undervoltage condition (or other startup) conditions. Another benefit is to provide a monotonic startup, such that the output voltage does not droop whether the primary controller is in control or the secondary controller is in control. To reduce output voltage ripple, an example secondary controller matches or synchronizes to the primary controller generated switching frequency when control is handed over from the primary controller to the secondary controller. To further increase the output voltage, the secondary controller then decreases the switching frequency in a controlled manner by using a frequency clock such as digital controlled oscillator and counters in accordance with the teachings of the present invention.

To illustrate, FIG. 1 is a functional block diagram illustrating one example of a resonant power converter 100 with a power converter controller 126 that includes a primary controller 127 and a secondary controller 128 in accordance with the teachings of the present invention. As shown in the depicted example, the primary controller 127 is on the primary side of the resonant power converter 100 and referenced to input return 108, while the secondary controller 128 is on the secondary side of the resonant power converter 100 and referenced to output return 132. Resonant power converter 100 further includes primary switching circuit 101, which includes a high side switch 104 coupled to a low side switch 106 as shown. The primary controller 127 is configured to generate a drive signal coupled to the primary switching circuit 101 to control the switching of the drive circuit 101 to control the transfer of energy from the input of the power converter 100 to the output of the power converter 100. In the depicted example, the drive signal includes a high side control signal $U_{HS}$ 105, which is coupled to drive the switching of the high side switch 104, and a low side control signal $U_{LS}$ 107, which is coupled to drive the switching of the low side switch 106. Also shown in resonant power converter 100 are a leakage inductance LLK 109, a magnetizing inductance LM 110, a resonant capacitor $C_{RES}$ 111, and an energy transfer element T1 112, which includes a primary winding 113, a first output winding 114, and a second output winding 115. In addition, resonant power converter 100 further includes a first output rectifier 116, a second output rectifier 117, an output capacitor $C_O$ 118, a load-power 122, a compensation circuit 123, a feedback circuit 124, and a sense circuit 125.

It is appreciated that resonant power converter 100 includes a resonant tank circuit that is coupled to the high side switch 104 and the low side switch 106. The resonant tank circuit includes tank inductance and a tank capacitance. For simplicity in this example parasitic (or non-explicit), inductance or capacitance in the resonant tank can be ignored. In the depicted example, the resonant tank circuit is an LLC circuit such that the tank inductance includes the leakage inductance LLK 109 and the magnetizing inductance $L_M$ 110. The tank capacitance includes resonant capacitor $C_{RES}$ 111. The leakage inductance LLK 109 and the magnetizing inductance $L_M$ 110 can be either discrete components or combined into a single transformer that includes the leakage and magnetizing elements, such as the energy transfer element T1 112.

In one example, the primary controller 127 and secondary controller 128 are galvanically isolated from another meaning there is no dc current path to allow current to flow from the primary side to the secondary side of the resonant power converter 100. In the depicted example, the secondary controller 128 can communicate a request for a transfer of energy to the primary controller 127 in a request signal $U_{REQ}$ 130 through a communication link 129. In one example, the communication link 129 is magnetically coupled between the primary controller 127 and secondary controller 128, while in other examples communication link 129 can be optically coupled, inductively coupled, or the like to maintain the galvanic isolation between the primary side and the secondary side of resonant power converter 100. It should be appreciated that in another example, the primary controller 127 and the secondary controller 128 may not be galvanically isolated.

As shown in the depicted example, the compensation circuit 123 is coupled between the output return 132 and the secondary controller 128, and includes capacitor 133 coupled to resistor 135, with capacitor 134 coupled in parallel across capacitor 133 and resistor 135. The compensation circuit 123 generates a compensation current for a compensation signal $U_{CMP}$ 138 from the secondary controller 128. In one example as will be discussed, a larger compensation signal $U_{CMP}$ 138 corresponds to a smaller output load-power 122. In other words, the compensation signal $U_{CMP}$ 138 increases as the load-power 122 decreases.

In operation, the resonant power converter 100 provides output power to the load-power 122 from an input voltage $V_{IN}$ 102. In one example, the input voltage $V_{IN}$ 102 from a DC voltage source. The high side switch 104 is coupled to receive the input voltage $V_{IN}$ 102 from a first end of the high side switch 104. The second end of high side switch 104 is coupled to a first end of the low side switch 106 by half bridge node 103. The second end of low side switch 106 is further coupled to the input return 108. The resonant capacitor $C_{RES}$ 111 is coupled to a magnetizing inductance $L_M$ 110 and may function together as a tank circuit coupled to the high side switch 104 and low side switch 106 at the half bridge node 103. Energy transfer element T1 112 is coupled to the tank circuit that includes resonant capacitor $C_{RES}$ 111, leakage inductance LLK 109, and magnetizing inductance $L_M$ 110 such that energy is transferred from the primary winding 113 to the output windings 114 and 115 in response to the switching of the high side switch 104 and low side switch 106. First output winding 114 is coupled to a first rectifier D1 116. In one example, the first rectifier D1 116 is a diode. However, in some examples, the first rectifier D1 116 may be a transistor used advantageously as a synchronous rectifier. Energy is transferred and rectified by first rectifier D1 116 when the high side switch 104 is turned ON and the low side switch 106 is OFF. The second output winding 115 is coupled to second rectifier D2 117. In one example, the second output rectifier D2 117 is a diode. However, in some examples, the second output rectifier D2 117 may be a transistor used as a synchronous rectifier. Energy is transferred and rectified by second output rectifier D2 117 when the high side switch 104 is turned OFF and the low side switch 106 is ON. The output capacitor $C_O$ 118 and load-power 122 are coupled to the first output rectifier D1 116 and second output rectifier D2 117. An output is provided to the load-power 122 and may be provided as an output voltage $V_O$ 120, an output current $I_O$ 121, or a combination of the two. For a resonant converter, the output voltage $V_O$ 120 is controlled by adjusting the switching frequency and not the duty cycle of the primary switching circuit 101. In steady state conditions, the duty cycle of an LLC half bridge is ideally fifty percent for the low side switch 106 and high side switch 104.

In the depicted example, the sense circuit 125 is coupled to sense the half bridge voltage $V_{HB}$ 139, and the voltage $V_{CRES}$ across the resonant capacitor $C_{RES}$ 111 and generate a sense signal $U_{SENSE}$ 131. In one example, the sense circuit 125 can be a winding of energy transfer element T1 112. In various examples, the sense signal $U_{SENSE}$ 131 can be representative of multiple characteristics of the resonant power converter 100. In one example, the sense signal $U_{SENSE}$ 131 can be representative of the switching signals of the primary switching circuit 101. The sense signal $U_{SENSE}$ 131 can also be representative of the input voltage $V_{IN}$ 102, which may be a voltage or current signal. The sense signal $U_{SENSE}$ 131 can further be representative of the sensed output power, the power delivered by the energy transfer element T1 112, the input power, or power processed by the converter, and may be a voltage signal or a current signal.

At startup, the initial voltages on the output load-power, of the power converter typically power up from a low voltage or substantially zero volts. As such, the secondary controller 128 is initially in an undervoltage condition at startup. However, the primary controller 127 is coupled to the input voltage $V_{IN}$ 102 on the input side, and therefore has power to control the switching frequency of the primary switching circuit 101 initially during the startup condition. After the voltages on the load-power side rise sufficiently and are no longer in the undervoltage condition, the secondary side can take control of generating the switching frequency of the power converter via the request signal $U_{REQ}$ 130 through the primary controller 127 after startup in accordance with the teachings of the present invention.

In the depicted example, the drive signal output from the primary controller 127 includes the high side control signal $U_{HS}$ 105 and the low side control signal $U_{LS}$ 107 to control the switching of high side switch 104 and low side switch 106, respectively, and control the transfer of energy from the primary winding 113 to the output windings 114 and 115 until the secondary controller 128 is no longer in the undervoltage condition. It is understood that reducing the switching frequency in an LLC converter can generate more output voltage (and generally deliver more power to the output). In order to increase the output voltage $V_O$ 120 on the secondary side, the switching frequency of the high side switch 104 and low side switch 106 in primary switching circuit 101 is sequentially decreased during startup. In one example, the primary controller 127 includes circuitry that generates a corresponding switching frequency that sequentially steps down or decays at a first rate in order to increase the output voltage $V_O$ 120. In the depicted example, the output windings 114 and 115 are coupled provide power to the secondary controller 128 via a bypass voltage $V_{BPS}$ 119.

When the bypass voltage $V_{BPS}$ 119 provides a sufficient regulated voltage to the secondary controller 128 that is greater than an undervoltage threshold, the secondary controller 128 can communicate to the primary controller 127 that it is no longer in the undervoltage condition, and that it is therefore ready to take over control of generating the switching frequency of the primary switching circuit 101. In one example, the secondary controller 128 transmits one or more request signals $U_{REQ}$ 130 to the primary controller 127 via the communication link 129 to indicate an end of the primary startup condition. In particular, in one example the secondary controller 128 transmits the one or more request signals $U_{REQ}$ 130 to the primary controller that the secondary controller 128 of power converter 100 is out of the under-voltage condition. In one example, the one or more request signals $U_{REQ}$ 130 can be one or more pulses. After the one or more request signals $U_{REQ}$ 130 are received by the primary controller 127 from the secondary controller 128, the sequential decrease rate of the primary switching frequency generated by the primary controller 127 is slowed down. At some point after this, the secondary controller 128 takes control of generating the switching frequency of the primary switching circuit 101. During this period of sloweddown primary frequency reduction, the system is still essentially open-loop (i.e., the primary switching frequency is controlled and does not respond to changes in to the output voltage). Therefore during open-loop operation benefit of slowing down the switching frequency generated by the primary controller 127 is to prevent output voltage from rising too quickly. Slowing down the rise in output voltage can prevent output overvoltage and give time for the secondary controller 128 to take control of generating the switching frequency prior to the output voltage reaching or exceeding an intended closed-loop regulation threshold.

The secondary controller 128 can communicate one or more request signals to communicate additional information to the primary controller 127 for synchronizing the primary controller 127 and secondary controller 128 such as control settings. In one example, in order to facilitate the smooth transition of controlling the switching frequency of the primary switching circuit 101, the secondary controller 128 is coupled to sense the switching frequency (and phase), generated by the primary controller with sense signal $U_{SENSE}$ 131 so that the secondary controller 128 can match and synchronize with the switching frequency (and phase), generated by primary controller 127. In other words, secondary controller 128 can prevent a discontinuity in output voltage by matching the switching frequency (and phase), generated by the primary controller. In one example, the discontinuity in output voltage can appear as a momentary droop in the output voltage if the secondary controller takes over with a too high a frequency (or incorrect phase). In another example, if the secondary controller takes over with too low a frequency (or incorrect phase), over-current and/or hard switching can occur. After the request signals $U_{REQ}$ 130 with the verification information are received by the primary controller 127, the secondary controller 128 initiates the handover to take over control from the primary controller 127 for the secondary controller to control the generation of the switching frequency of the primary switching circuit 101 in accordance with the teachings of the present invention.

As will be discussed, after taking control, the secondary controller 128 initially generates a switching frequency (and phase) that matches the switching frequency (and phase) generated by the primary controller 127 as sensed through the sense circuit 125. In one example, after the secondary controller completes handover, the secondary controller may significantly change the operating frequency, running open-loop at maximum power until the feedback circuit 124 reaches the output voltage regulation threshold. At this point the loop goes into closed-loop regulation. In one example, during open-loop operations following secondary handover, the secondary controller could use limit functions such as an independent soft-finish (or frequency rate of change) methods to limit switching frequencies prior to closed-loop regulation.

In examples that implement secondary soft-start, large decreases in the switching frequency by the secondary controller are limited to a set amount every half cycle to avoid large swings in the switching frequency during the transfer. In one example, a ramp clock circuit can provide the switching frequency until the switching frequency falls to the half cycle limit. The ramp clock circuit can aid in preventing hard switching events to occur. A hard switching event can be defined when the power switches when the voltage across the power switch is not substantially zero, which can decrease the efficiency of the resonant power converter, and disturb the resonant operation of the resonant tank. After the switching frequency has fallen to the half cycle limit, the secondary controller 128 can generate the switching frequency by a request clock circuit, and normal operation can ensue in accordance with the teachings of the present invention.

Figure 2:
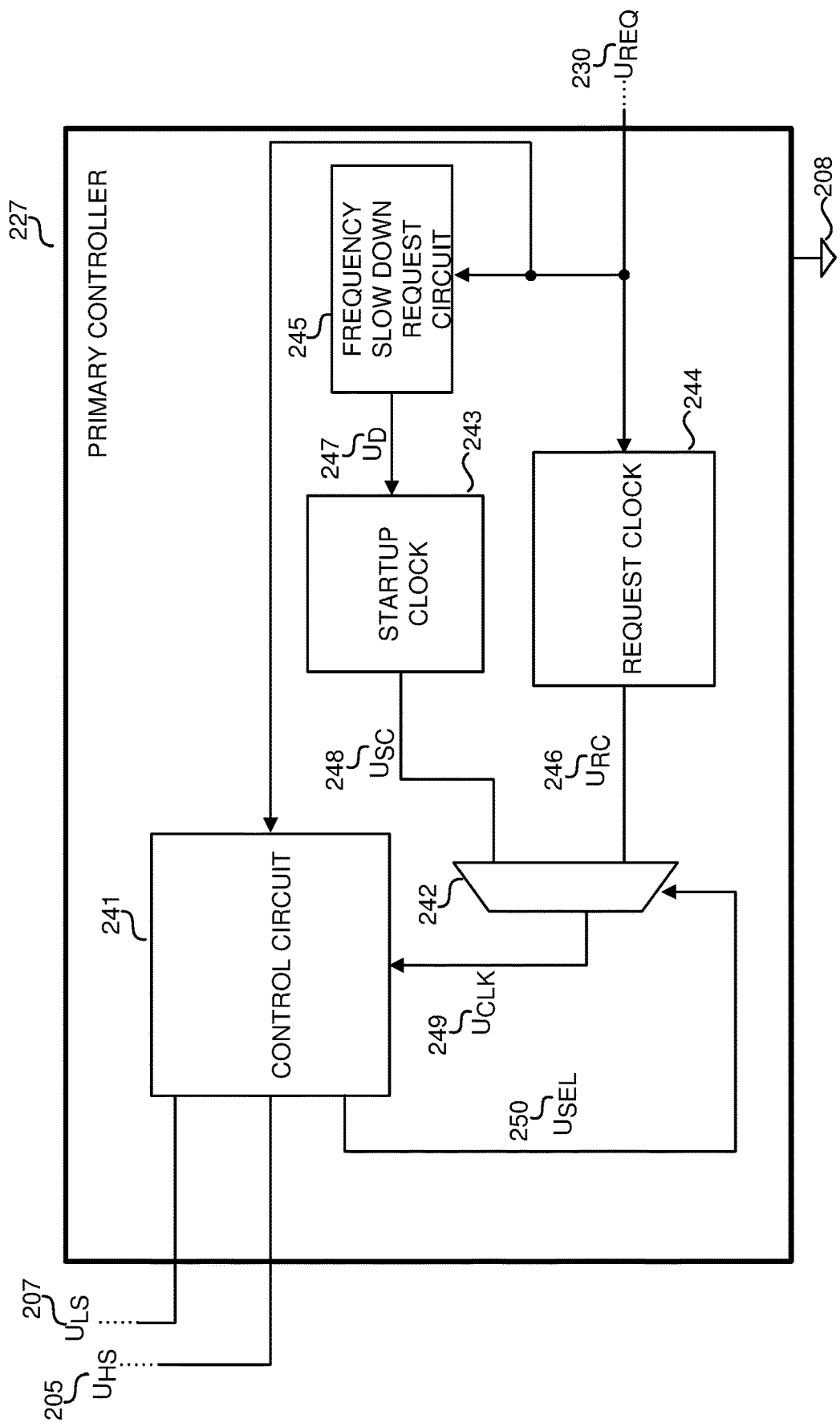
FIG. 2 is a functional block diagram illustrating one example of a primary controller in accordance with the teachings of the present invention.

FIG. 2 is a functional block diagram illustrating one example of a primary controller 227 in accordance with the teachings of the present invention. It is appreciated that primary controller 227 of FIG. 2 may be an example of primary controller 127 of FIG. 1, and that similarly named and numbered elements referenced below may be coupled and function similar to as described above. As shown in FIG. 2, primary controller 227 is referenced to input return 208 and includes a control circuit 241, a multiplexer 242, a startup clock 243, a request clock 244, and frequency slow down request circuit 245. In the example, the control circuit 241 is configured to generate the high side control signal $U_{HS}$ 205 and the low side control signal $U_{LS}$ 207 of the drive signal to control the switching of the high side switch and low side switch of primary switching circuit of the power converter.

As shown, the multiplexer 242 includes a first input that is coupled to receive a startup clock signal $U_{SC}$ 248 from startup clock 243. Multiplexer 242 further includes a second input coupled to receive a request clock signal $U_{RC}$ 246 from request clock 244, which is coupled to receive the request signal $U_{REQ}$ 230 from the secondary controller. Multiplexer 242 generates the clock signal $U_{CLK}$ 249 that is coupled to be received by control circuit 241 to control the switching frequency for the high side control signal $U_{HS}$ 205 and the low side control signal $U_{LS}$ 207 in accordance with the teachings of the present invention.

During normal operation, the control circuit 241 generates select signal $U_{SEL}$ 250 that is coupled to the select input of the multiplexer 242 to select the request clock signal $U_{RC}$ 246 from the request clock 244, which is coupled to receive the request signal $U_{REQ}$ 230 from the secondary controller after startup to generate the switching frequency of the high side control signal $U_{HS}$ 205 and the low side control signal $U_{LS}$ 207.

However, at startup the primary controller 227 does not utilize the request signal $U_{REQ}$ 230 from the secondary controller to control the switching frequency of the high side control signal $U_{HS}$ 205 and the low side control signal $U_{LS}$ 207 because the secondary controller is in an undervoltage condition at startup. In another example, a fault condition can cause the secondary controller to relinquish control back to the primary controller. Instead, the startup clock 243 of primary controller 227 is used to control the switching frequency of the high side control signal $U_{HS}$ 205 and the low side control signal $U_{LS}$ 207. Thus, at startup the control circuit 241 generates select signal $U_{SEL}$ 250 to control the multiplexer 242 to select the startup clock signal $U_{SC}$ 248 from startup clock 243 for the clock signal $U_{CLK}$ 249 to control the switching frequency of the high side control signal $U_{HS}$ 205 and the low side control signal $U_{LS}$ 207.

In one example, the select signal $U_{SEL}$ 250 generated by the control circuit 241 can be a logic low to select the startup clock signal $U_{SC}$ 248, and a logic high of select signal $U_{SEL}$ 250 selects the request clock signal $U_{RC}$ 246. The control circuit 241 can keep track of whether the power converter is in the startup condition due to for example the undervoltage condition, and whether the primary controller or secondary controller should be in control to generate the switching frequency of the high side control signal $U_{HS}$ 205 and the low side control signal $U_{LS}$ 207. In one example, the startup clock 243 generates the startup clock signal $U_{SC}$ 248 to have a switching frequency that starts above the normal frequency range and that sequentially steps down or smoothly decreases at a first rate in order to increase the output voltage of the power converter to get the secondary controller out of the undervoltage condition at startup. In the example, once the secondary controller is out of the undervoltage condition at startup, a command in the request signal $U_{REQ}$ 230 transmitted from the secondary controller is received by the request clock 244 and the frequency slow down request circuit 245. In the example, the frequency slow down request circuit 245 is coupled to receive the command in the request signal $U_{REQ}$ 230 and generate a one time signal $U_D$ 247 that is received by the startup clock 243. In the absence of the frequency slow down request circuit 245 receiving a request signal $U_{REQ}$ 230, the frequency slow down request circuit 245 can determine that the secondary controller is in an undervoltage (or fault) condition. In another example, the frequency slow down request circuit 245 can receive the request signal $U_{REQ}$ 230 after the exit of other startup conditions. After receiving the one time signal $U_D$ 247, the startup clock slows the decrease rate of the switching frequency of the startup clock signal $U_{SC}$ 248 to slow the decrease rate of the switching frequency of the primary switching circuit after receiving the one time signal $U_D$ 247.

After sending the command in the request signal $U_{REQ}$ 230 indicating the end of the undervoltage condition, the secondary controller can then sense the switching frequency of the primary switching circuit generated from startup clock signal $U_{SC}$ 248 in the primary controller to match and synchronize with the switching frequency from request clock signal $U_{RC}$ 246. When the secondary controller has matched and synchronized with switching frequency from startup clock signal $U_{SC}$ 248 in the primary controller, the secondary controller can then send one or more request signals $U_{REQ}$ 230 to the primary controller 227 as the secondary controller completes its' initialization functions. After the transmission of initialization information from the secondary controller to the primary controller 227, the secondary controller sends a further command $U_{REQ}$ 230, on receipt of which the primary control circuit 241 is configured to generate the select signal $U_{SEL}$ 250 to select the request clock signal $U_{RC}$ 246 instead of the startup clock signal $U_{SC}$ 248 for the clock signal $U_{CLK}$ 249. Following this, the switching frequency (and phase) of the high side control signal $U_{HS}$ 205 and the low side control signal $U_{LS}$ 207 are controlled in response to the request signal $U_{REQ}$ 230 from the secondary controller after startup in accordance with the teachings of the present invention.

Figure 3:
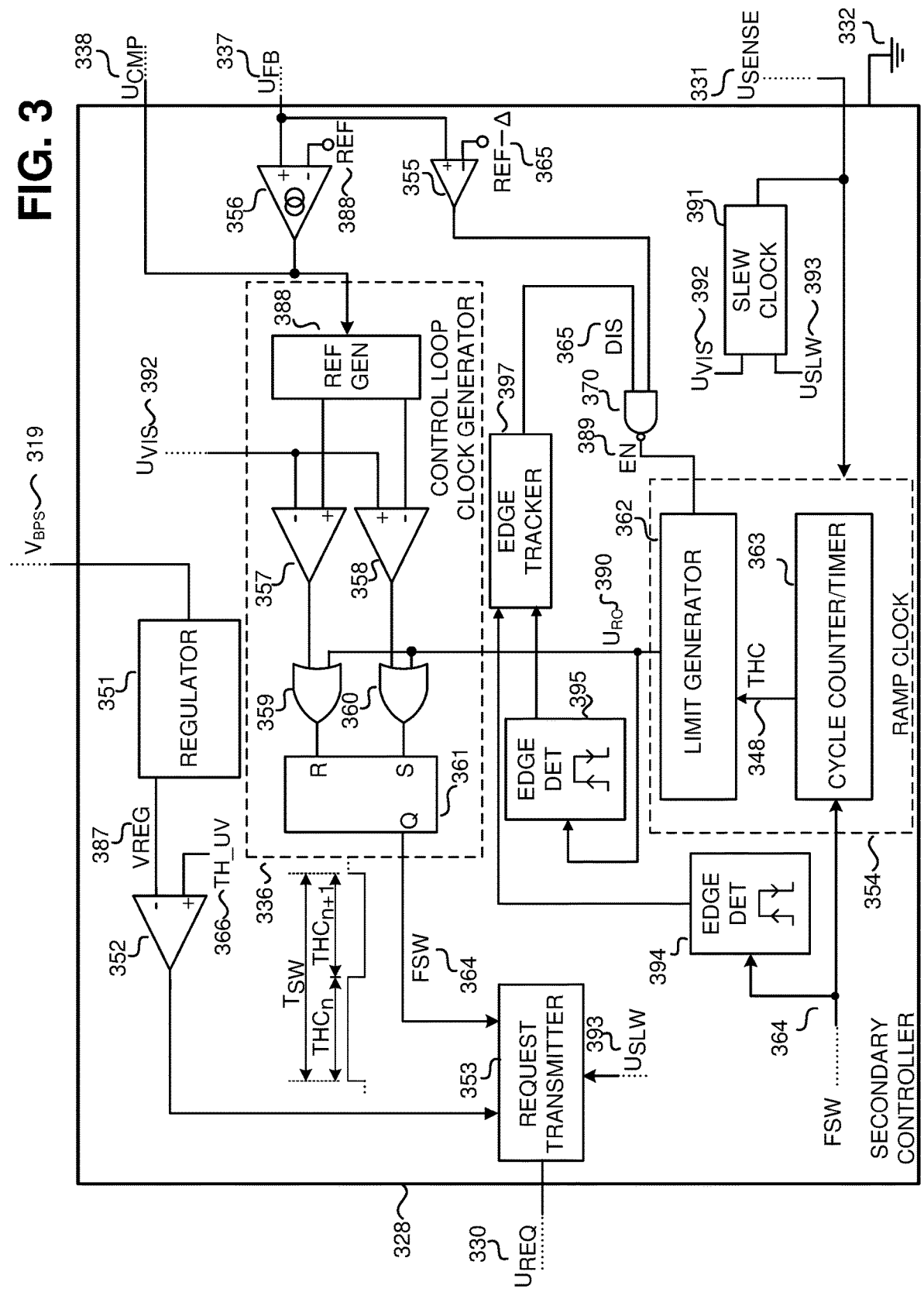
FIG. 3 is a functional block diagram illustrating one example of a secondary controller in accordance with the teachings of the present invention.

FIG. 3 is a functional block diagram illustrating one example of a secondary controller 328 in accordance with the teachings of the present invention. It is appreciated that secondary controller 328 of FIG. 3 may an example of secondary controller 128 of FIG. 1, and that similarly named and numbered elements referenced below may be coupled and function similar to as described above. As shown in FIG. 3, secondary controller 328 is referenced to output return 332, includes a regulator 351, a comparator 352, a request transmitter 353, a ramp clock 354, a control loop clock generator 336, a comparator 355, a transconductance amplifier 356, a comparator 369, a logic gate 370, a slew clock 391, a first edge detector circuit 394, a second edge detector circuit 395, and edge tracker circuit 397. As shown in the depicted example, the ramp clock 354 includes a limit generator 362 and a cycle counter/timer 363. The control loop clock generator 336 includes comparators 357 and 358, logic gates 359 and 360, latch 361, and a reference generator 388.

Regulator 351 is coupled to receive bypass voltage $V_{BPS}$ 319, which as described previously, may be provided by the output windings (e.g., 114 and 115) to the secondary controller 328. At startup, secondary controller 328 is in an undervoltage condition because the voltages at the output windings of the power converter are initially substantially zero. In other words, the secondary controller 328 is inactive at startup because the output voltage of the power converter and the bypass voltage $V_{BPS}$ 319 are initially zero. As the output voltage and bypass voltage $V_{BPS}$ 319 rise from zero during startup, the regulator 351 is eventually able to begin providing regulated voltage $V_{REG}$ 387. The comparator 352 is coupled to receive and monitor the regulated voltage $V_{REG}$ 387 from a regulator 351, and once the regulated voltage $V_{REG}$ 387 is greater than an under voltage threshold TH_UV 366, the secondary controller 328 is no longer in an undervoltage condition. The output of comparator 352 is coupled to the request transmitter 353, which in one example sends a command in the request signal $U_{REQ}$ 330, which coupled to be received by to the primary controller through a communication link (e.g., 129), to indicate the end of the undervoltage condition to the primary controller. The request transmitter 353 is further coupled to receive the slew signal 393. The slew signal 393 can be representative of the half bridge voltage as shown in FIG. 1. The slew signal 393 is in a first state when the half bridge voltage is at the input voltage, and the slew signal 393 is in a second state when the half bridge voltage is at substantially zero. In order words, the slew signal is representative of transitions of the half bridge voltage. The slew signal 393 can be used by the request transmitter 353 to control the primary switching circuit. In one example, the request transmitter 353 transmits a request signal 330 when the slew signal 393 transitions to a logic low. The control loop clock generator 336 and ramp clock circuit 354 are also enabled when the secondary controller 328 is no longer in the undervoltage condition.

Transconductance amplifier 356 is coupled to receive a feedback signal $U_{FB}$ 337 and a feedback reference REF 388, and outputs the compensation signal $U_{CMP}$ 338, which in one example is a current signal representative of the difference between the feedback signal $U_{FB}$ 337 and the feedback reference REF 388. As mentioned previously, in one example the output of the transconductance amplifier 356 is also coupled to a compensation circuit (e.g., 123), which provides loop compensation for the feedback loop of the resonant power converter. Further, the compensation circuit may alter the response time of the feedback loop of the resonant power converter. With the compensation circuit 123, the compensation signal $U_{CMP}$ 338 received by the control loop clock generator 336 may be a voltage. In one example, a larger value for the compensation signal $U_{CMP}$ 338 corresponds to a smaller power delivered to the load-power. In other words, the compensation signal $U_{CMP}$ 338 increases as the load-power coupled to the output of the resonant power converter decreases.

The comparator 355 compares the feedback signal $U_{FB}$ 337 to a reference voltage minus delta 365. In one example, the reference voltage minus delta can be representative of a voltage that is close to the regulated voltage. The output of comparator 355 is coupled to logic gate 370. In operation, the enable signal EN 389 is logic high when the feedback signal is less than the reference voltage minus delta 365. The logic gate 370 is configured to generate the enable signal EN 389 to enable the operation of ramp clock 354. The edge tracker circuit 397 is configured to determine an edge on the switching frequency signal FSW 364 before an edge on the ramp clock signal $U_{RC}$ 390. The enable signal EN 389 is logic low when the feedback signal is greater than the reference voltage minus delta 365 and an edge on the switching frequency signal FSW 364 occurs before an edge on the ramp clock signal $U_{RC}$ 390.

Initially as the secondary controller 328 takes control of controlling the switching frequency of the high side switch and low side switch of the primary switching circuit, the ramp clock circuit 354 generates a ramp clock signal $U_{RC}$ 390 that is coupled to be received by the control loop clock generator 336. The ramp clock 354 limits the large decreases in switching frequency based on the previous half cycle and signals this to the control loop clock generator 336 via the output ramp signal $U_{RC}$ 390. The ramp clock 354 updates the limit each N half period, where N can be one or greater than one. To further illustrate, the table shows the limit each half cycle, where the maximum on time does not increase until the N half cycles, where N can be 1 or greater than. At the N half cycle, the maximum on time can increase by a factor of K, where the value of K can be one or greater than 1. The ramp clock 354 updates the half period by limiting every half-cycle, and then every N half cycle, may modify maximum on time (the inverse of twice the instantaneous switching frequency) by a prescribed amount.

| Half Cycle | TonMax |
|---|---|
| 0 | Tprev |
| 1 | Tprev |
| i | Tprev |
| N | Tprev + K |

As shown in the illustrated example, cycle counter/timer 363 is a timer that is coupled to receive a switching frequency signal FSW 364 from control loop clock generator 336 and outputs a measured length or count of a half cycle THC 348. In operation, the cycle counter/timer 363 utilizes the switching frequency signal FSW 364 to measure and store the lengths of half cycles of the switching frequency signal FSW 364. In one example, the cycle counter/timer 363 is a timer that outputs the measured count value of the previous half cycle $THC_{n-1}$ and the running count value of the current half cycle $THC_n$. Optionally, the cycle counter/timer 363 may receive the sense signal $U_{SENSE}$ 331 to indirectly determine the half cycles of the switching frequency signal FSW 364.

The limit generator 362 is coupled to receive the measured half cycle THC 348 and the enable signal EN 389, and outputs a ramp clock signal $U_{RC}$ 390. In one example, the measured half cycle THC 348 generated by the cycle counter/timer 363 provides the measured value of the previous half cycle $THC_{n-1}$ and the running value of the current half cycle $THC_n$ to the limit generator 362. When enabled, limit generator 362 determines a maximum length for the current half cycle $THC_n$ in response to the measured length of the previous half cycle $THC_{n-1}$. In one example, the limit/maximum length of the current half cycle $THC_n$ is not to exceed the length of the previous half cycle $THC_{n-1}$ by a fixed amount K. In one example, the ramp clock signal $U_{RC}$ 390 is a pulsed waveform that pulses to a logic high value when the calculated maximum limit for the current half cycle has been reached.

As shown in FIG. 3, the control loop clock generator 336 includes a reference generator 388, comparators 357 and 358, OR gates 359 and 360, and latch 361. Reference generator 388 is coupled to receive the compensation signal $U_{CMP}$ 338 and generate the first and second references for comparators 357 and 358, respectively, in response to the compensation signal $U_{CMP}$ 338. Comparator 358 is coupled to receive the second reference from the reference generator 388 at its inverting input and the sense signal $U_{SENSE}$ 331 at its non-inverting input. Comparator 357 is coupled to receive the first reference from the reference generator 388 at its non-inverting input and the sense interface signal $U_{VIS}$ 392 at its inverting input.

OR gate 359 is coupled to receive the output of comparator 357 and the ramp clock signal $U_{RC}$ 390 from ramp clock 354. OR gate 360 is coupled to receive the output of comparator 358 and the inverted ramp clock signal $U_{RC}$ 390, as shown by the circle at one of the inputs of OR gate 360, from ramp clock 354. Latch 361 is coupled to receive the outputs of OR gates 359 and 360. In the example shown, the latch 361 receives the output of OR gate 360 at its set S input and receives the output of OR gate 359 at its reset R input. The output of the latch 361 is the switching frequency signal FSW 341. In operation, the latch 361 is set, and the switching frequency signal FSW 364 transitions to a logic high value, when the sense signal $U_{SENSE}$ 331 is greater than the reference provided by the reference generator 388 or the ramp clock signal $U_{RC}$ 390 is asserted (i.e., the half cycle limit determined by the ramp clock 354 has been reached). The latch 361 is reset, and the switching frequency signal FSW 364 transitions to a logic low value, when the sense signal $U_{SENSE}$ 331 falls below the reference provided by the reference generator 388 or the ramp clock signal $U_{RC}$ 390 is asserted (i.e., the half cycle limit determined by the ramp clock 354 has been reached). By varying the values of the references output by the reference generator 388 in response to the compensation signal $U_{CMP}$ 338, the control loop clock generator 336 controls the switching frequency and switching period of the high side and low side switches and the amount of energy delivered to the output load-power of the power converter.

As illustrated in FIG. 3, each switching period $T_{SW}$ for the switching frequency signal FSW 364 includes two half cycles, shown as half cycle $THC_n$ and $THC_{n+1}$. The switching frequency signal FSW 364 is logic high during one of these half cycles (i.e., $THC_n$) and logic low during the other half cycle (i.e., $THC_{n+1}$). The switching period $T_{SW}$ and the lengths of the half cycles $THC_n$ and $THC_{n+1}$ are used to control the amount of energy delivered to the load-power. The longer the switching period $T_{SW}$ (i.e., the longer the half cycles $THC_n$ and $THC_{n+1}$), the more energy is delivered to the output of the power converter and the load-power. Under steady state conditions, the two half cycles $THC_n$ and $THC_{n+1}$ are substantially equal. However, under transient conditions, the lengths of the two half cycles $THC_n$ and $THC_{n+1}$ are varied, which therefore varies the overall switching period $T_{SW}$, to bring the output of the power converter back into regulation.

When the ramp clock 354 is enabled via enable signal EN 389, the ramp clock 354 controls the rate at which the half cycles $THC_n$ and $THC_{n+1}$ can change. The control loop clock generator 336 receives the ramp clock signal $U_{RC}$ 390 representative of the maximum length of the current half cycle. The ramp clock signal $U_{RC}$ 390 may be a pulsed signal that pulses to a logic high value when the limit/maximum length of the current half cycle has elapsed. In response to the received pulse in the ramp clock signal $U_{RC}$ 390, the control loop clock generator 336 terminates the current half cycle via OR gates 359 and 360, and latch 361 in accordance with the teachings of the present invention.

As shown in the depicted example, the switching frequency signal FSW 341 is received by the request transmitter 353. The frequency of the request signal REQ 330 is responsive to the switching frequency/period set by the switching frequency signal FSW 364. In one example, a leading edge in the switching frequency signal FSW 364 corresponds to turning on the high side switch, while a trailing edge in the switching frequency signal FSW 364 corresponds to turning on the low side switch.

Figure 4:
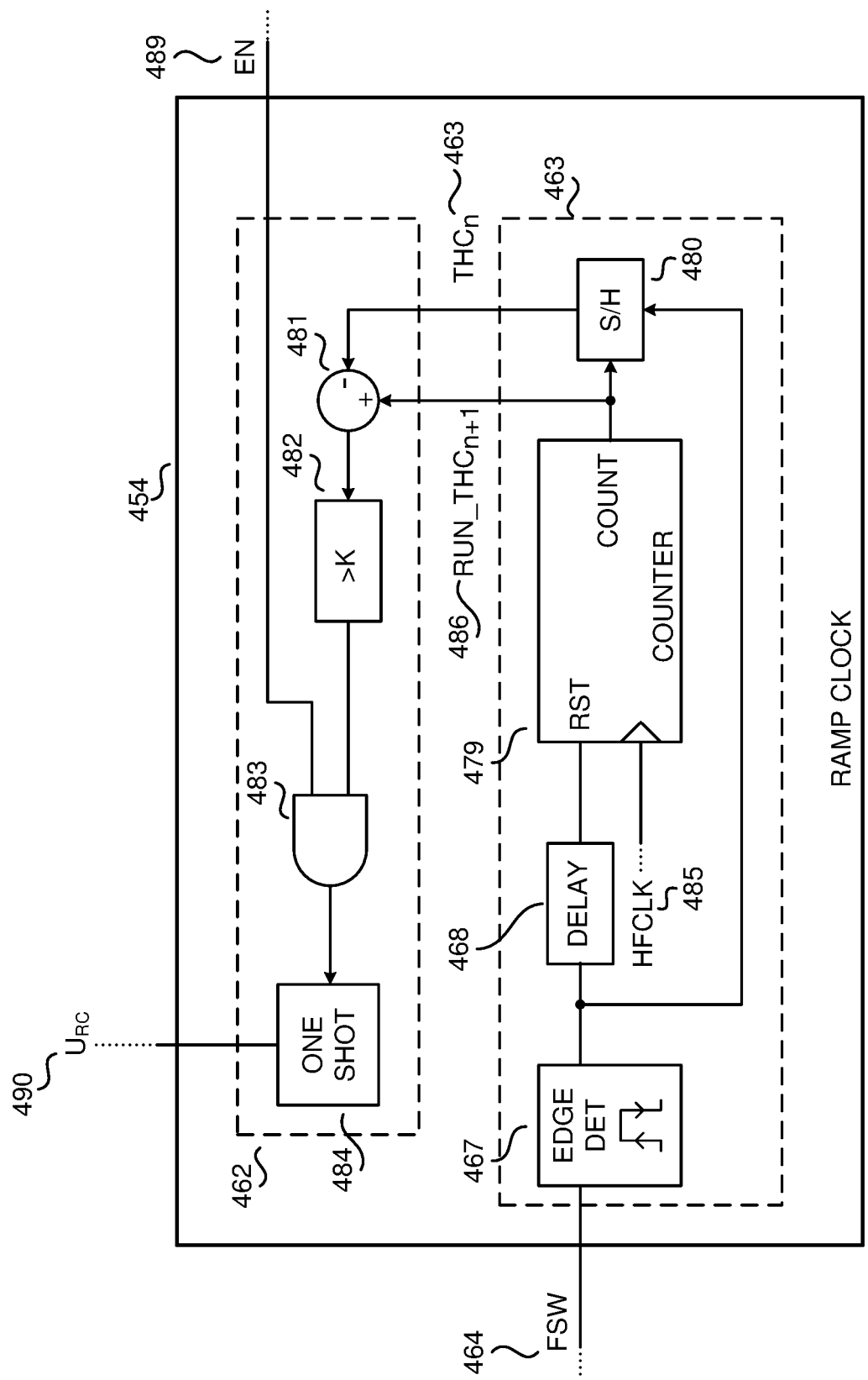
FIG. 4 is a functional block diagram illustrating one example of a ramp clock circuit in accordance with the teachings of the present invention.

FIG. 4 is a functional block diagram illustrating one example of a ramp clock 454 circuit in accordance with the teachings of the present invention. It is appreciated that ramp clock 454 of FIG. 4 may an example of ramp clock 354 of FIG. 3, and that similarly named and numbered elements referenced below may be coupled and function similar to as described above. As shown in FIG. 4, ramp clock 454 includes the cycle counter/timer 463 and limit generator 462. The cycle counter/timer 463 is shown as including an edge detector 467, delay circuit 468, counter 479 and sample and hold circuit 480. In one example, the cycle counter can be a digital implementation to counting half cycles. In other examples, a timer circuit (not shown) can be modified to counting half cycles in an analog implementation.

The edge detector 467 receives the switching frequency signal FSW 464 and detects both the leading and trailing edges of the switching frequency signal FSW 464. In one example, edge detector 467 outputs a pulse at every leading and trailing edge of the switching frequency signal FSW 464. The output of the edge detector 467 is received by the delay circuit 468 and sample and hold circuit 480.

The counter 479 is shown as coupled to the delay circuit 468 and receives a delayed version of the edge pulses of the edge detector 467 at its reset input. The counter 479 is also coupled to receive a high frequency clock signal HFCLK 485 at its clock input. The sample and hold circuit 480 is coupled to receive the output COUNT from the counter 479 and the output of the edge detector 467.

In operation, the edge detector 467 outputs a pulse for every leading and trailing edge of the switching frequency signal FSW 464. In response to a pulse output from the edge detector 467, the sample and hold circuit 480 samples and holds the COUNT value output from the counter 479. The pulse output from the edge detector 467 is also delayed through delay circuit 468 to reset the counter 479. The sample and hold circuit 480 is coupled to sample and hold the COUNT value of the half cycle before the counter 479 is reset through delay circuit 468. The counter 479 counts the number of high frequency clock HFCLK 485 edges that occur between the delayed pulses output from the edge detector 467. In other words, the counter 479 counts the number of high frequency clock HFCLK 485 between edges of the switching frequency signal FSW 464. Therefore, at any given time, the COUNT output of the counter 479 is the running count $RUN\_THC_{n+1}$ 486 of the current half cycle, while the output of the sample and hold circuit 480 is the measured count of the previous half cycle $THC_n$ 463.

The limit generator 462 is shown as including an arithmetic operator 481, a comparator 482, an AND gate 483, and a monostable multivibrator 484, which may also be referred to as a one shot. As shown, the arithmetic operator 481 is coupled to receive the measured count of the previous half cycle $THC_n$ 463 from the sample and hold circuit 480, and the running count $RUN\_THC_{n+1}$ 486 of the current half cycle, which is the COUNT output from the counter 479. In operation, the arithmetic operator 481 outputs the difference between the running count $RUN\_THC_{n+1}$ 486 of the current half cycle and the measured count of the previous half cycle $THC_n$ 463. The difference output by arithmetic operator 481 is received by comparator 482.

Comparator 482 receives the difference between the running count $RUN\_THC_{n+1}$ 486 of the current half cycle and the measured count of the previous half cycle $THC_n$ 463 from the arithmetic operator 481 and compares the difference to the fixed value K. If the difference is greater than or equal to the fixed value K, comparator 482 outputs a logic high value. AND gate 483 is coupled to receive the enable signal EN 489 and the output of comparator 482. The output of AND gate 483 is received by one shot 484, which outputs the ramp signal $U_{RC}$ 490. If the output of comparator 482 is logic high, which indicates that the difference between running count $RUN\_THC_{n+1}$ 486 of the current half cycle and the measured count of the previous half cycle $THC_n$ 463 is greater than or equal to the fixed value K, and if the enable signal EN 489 is logic high, which enables the limit generator 462, the output of AND gate 483 is logic high, which triggers the one shot 484 to output a pulse in the ramp signal $U_{RC}$ 490.

Figure 5A:
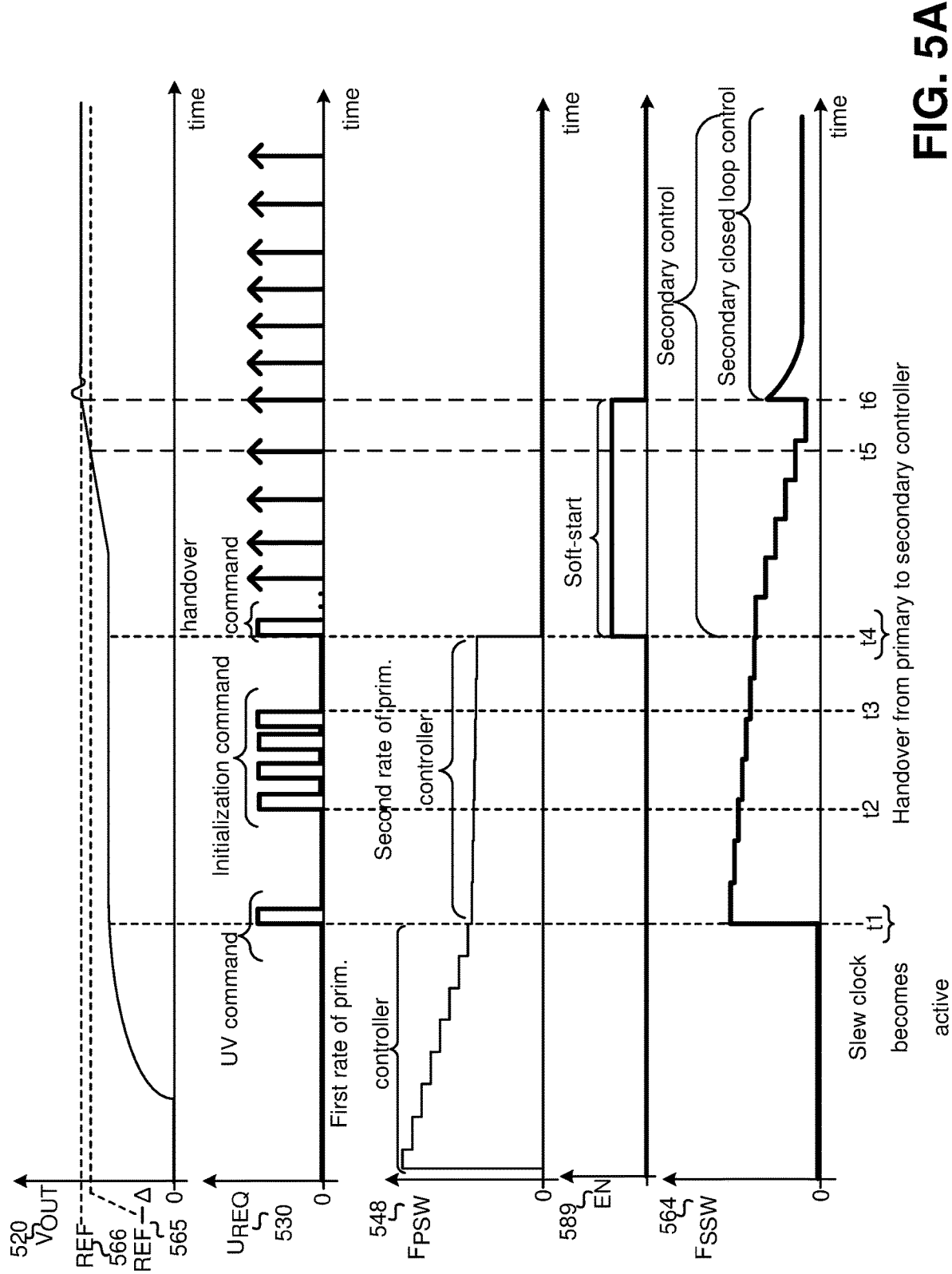
FIG. 5A illustrates a timing diagram showing one example of waveforms associated with the control of the switching frequency of a switching circuit of a resonant power converter with a primary controller and a secondary controller at startup in accordance with the teachings of the present invention.

FIG. 5A illustrates a timing diagram showing one example of waveforms associated with the control of the switching frequency of a primary switching circuit of a resonant power converter with a controller in accordance with the teachings of the present invention. In the depicted example, the timing diagram illustrates examples of waveforms $V_{OUT}$ 520, $U_{REQ}$ 530, and switching frequency $F_{PSW}$ 548 associated with a primary controller, an enable signal EN 589 associated with the secondary controller, and switching frequency signal $F_{SSW}$ 564 associated with a secondary controller that occur at startup illustrating the transfer of control of the switching frequency from the primary controller to the secondary controller in accordance with the teachings of the present invention. It is appreciated that waveforms $V_{OUT}$ 520, $U_{REQ}$ 530, $F_{PSW}$ 548, enable signal EN 589, and $F_{SSW}$ 564 of FIG. 5A may be examples of the output voltage $V_O$, request signal $U_{REQ}$, enable signal, and switching frequency signal discussed previously, and that similarly named and numbered elements referenced below may be coupled and function similar to as described above. As shown in FIG. 5A, the first timing diagram illustrates an output voltage $V_{OUT}$ 520, the second timing diagram illustrates a request signal $U_{REQ}$ 530, and the third timing diagram illustrates a switching frequency signal $F_{PSW}$ 548 associated with the primary controller, the fourth timing diagram illustrates an enable signal EN 589, and the fifth timing diagram illustrates a switching frequency $F_{SSW}$ 564 associated with the secondary controller. For instance, in one example, the primary side generated switching frequency $F_{PSW}$ 548 may be generated by the primary controller via the startup clock signal $U_{SC}$ from the startup clock, and the secondary side generated switching frequency $F_{SSW}$ 564 may be generated by the secondary controller via the request signal $U_{REQ}$.

In the depicted example, prior to time t1, the secondary controller is in startup and therefore in an undervoltage condition. As such, the primary controller controls switching frequency for the high side switch and the low side switch. As shown, the switching frequency $F_{PSW}$ 548 generated by the primary controller steps down sequentially at a first rate as the output voltage $V_{OUT}$ 520 rises.

At time t1, a command of the request signal $U_{REQ}$ 530 that is transmitted from the secondary controller to the primary controller, which indicates that the secondary controller is out of the undervoltage condition since the output voltage $V_{OUT}$ 520 has been raised sufficiently. After time t1, the switching frequency FSW 564 continues to step down, but at a reduced rate compared to the first rate at which the switching frequency FSW 564 stepped down prior to time t1. The output voltage $V_{OUT}$ 520 remains substantially the same. At this time, the secondary controller is able to match and synchronize with the switching frequency controlled by the primary controller as shown by the fourth timing diagram. As mentioned previously, the sense circuit (e.g., 125) provides a sense signal (e.g., 131, 331) to the secondary controller that identifies what is the current switching frequency generated by the primary controller. The secondary controller can therefore synchronize the secondary side generated switching frequency to be the same frequency as generated by the primary controller.

From time t2 to t3, the secondary controller then sends one or more request signals $U_{REQ}$ 530 to provide calibration or initialization information or verification information to the primary controller. The output voltage $V_{OUT}$ 520 remains substantially the same during this time. From time t3 to before t4, the output voltage $V_{OUT}$ 520 remains substantially the same. The secondary controller continues to match the switching frequency controlled by the primary controller as shown by the fourth timing diagram.

At time t4, the secondary controller takes over control of controlling the switching frequency from the primary controller. The switching frequency $F_{PSW}$ 548 controlled by the primary controller falls to zero. After time t4, the secondary controller is in control of generating the switching frequency of the high side switch and the low side switch. As illustrated, the pulses in the request signal $U_{REQ}$ 530 are transmitted to control the switching of the high side switch and the low side switch. The secondary controller generated switching frequency $F_{SSW}$ 564 decreases in a controlled manner as the output voltage $V_{OUT}$ 520 rises. As shown in the depicted example, the enable signal EN 589 transitions to a logic high to enable soft-start mode. The soft-start mode prevents large decreases in the generated switching frequency $F_{SSW}$ 564 by the secondary controller to a set limit each N half period, where N can be 1 or greater than 1.

At time t5, the output voltage $V_{OUT}$ 520 reaches the reference voltage $-\Delta$ 565. At time t6, the control loop clock generator (FIG. 3) detects that the $U_{CMP}$ 338 is requesting an FSW period shorter than that of the limit generator. To disable secondary soft start for constant voltage (CV) regulation, the enable signal EN 589 transitions to a logic low when in addition to the output voltage $V_O$ 520 being greater than REF-$\Delta$ 565 and an edge on the secondary switching frequency signal FSW 564 is earlier than the ramp clock signal, indicating that the analog loop is control, as opposed to the digital loop from the ramp clock, and signaling the end of soft-start mode. To disable secondary soft-start for constant current (CC) regulation, the enable signal EN 589 transitions to a logic low if the edge on the secondary switching frequency signal FSW 564 is earlier than the ramp clock signal. The power converter can now operate in normal operating conditions. This transition by looking at FSW 564 earlier than the ramp clock signal, allows the secondary controller to exit secondary soft-start and enter closed loop control in response to both output voltage regulation feedback (vie $U_{FB}$ signal), or other types of regulation feedback (via $U_{CMP}$), examples of which could be but not limited to: external soft-finish network or external constant current control.

Figure 5B:
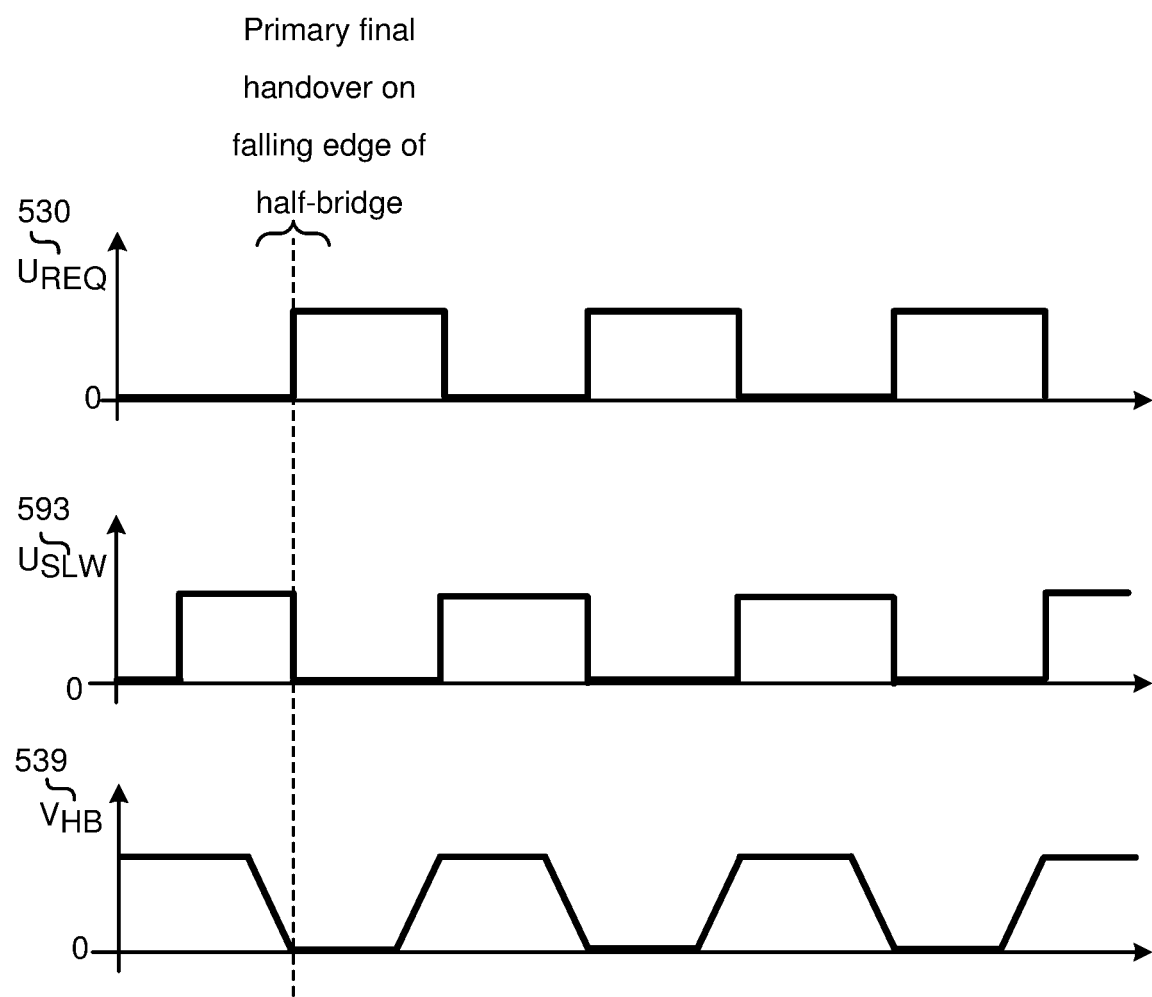
FIG. 5B illustrates a timing diagram showing one example of waveforms associated with handover control from a primary controller to a secondary controller in accordance with the teachings of the present invention.

FIG. 5B illustrates a timing diagram showing one example of waveforms associated with handover control from a primary controller to a secondary controller in accordance with the teachings of the present invention. In the depicted example, the timing diagram illustrates examples of waveforms the request signal $U_{REQ}$ 530, the slew signal $U_{SLW}$ 593, and the half bridge voltage $V_{HB}$ 539 for illustrating the transfer of control of the switching frequency from the primary controller to the secondary controller in accordance with the teachings of the present invention. It is appreciated that waveforms $U_{REQ}$ 530, slew signal $U_{SLW}$ 593, and the half bridge voltage $V_{HB}$ 539 of FIG. 5B may be examples of the request signal $U_{REQ}$, slew signal $U_{SLEW}$, and the half bridge voltage $V_{HB}$ discussed previously, and that similarly named and numbered elements referenced below may be coupled and function similar to as described above.

As shown in FIG. 5B, the slew signal $U_{SLW}$ 593 corresponds to when the half bridge voltage $V_{HB}$ 539 has completed slewing. In the example shown, a logic low of the slew signal $U_{SLW}$ 593 indicates the half bridge voltage $V_{HB}$ 539 has completed slewing when the half bridge voltage is at zero volts, while a logic high of the slew signal $V_{HB}$ indicates the half bridge voltage has completed slewing when it reaches the input voltage. The dashed line in FIG. 5B indicates when handover occurs, such that the secondary controller takes over control from the primary controller. As mentioned previously in FIG. 3, the request transmitter is configured to generate the request signal $U_{REQ}$ 530 in response to the slew signal $U_{SLW}$ 593. In the example of FIG. 5, the request signal $U_{REQ}$ 530 is generated when the slew signal $U_{SLW}$ 593 is at a logic low.

Figure 6:
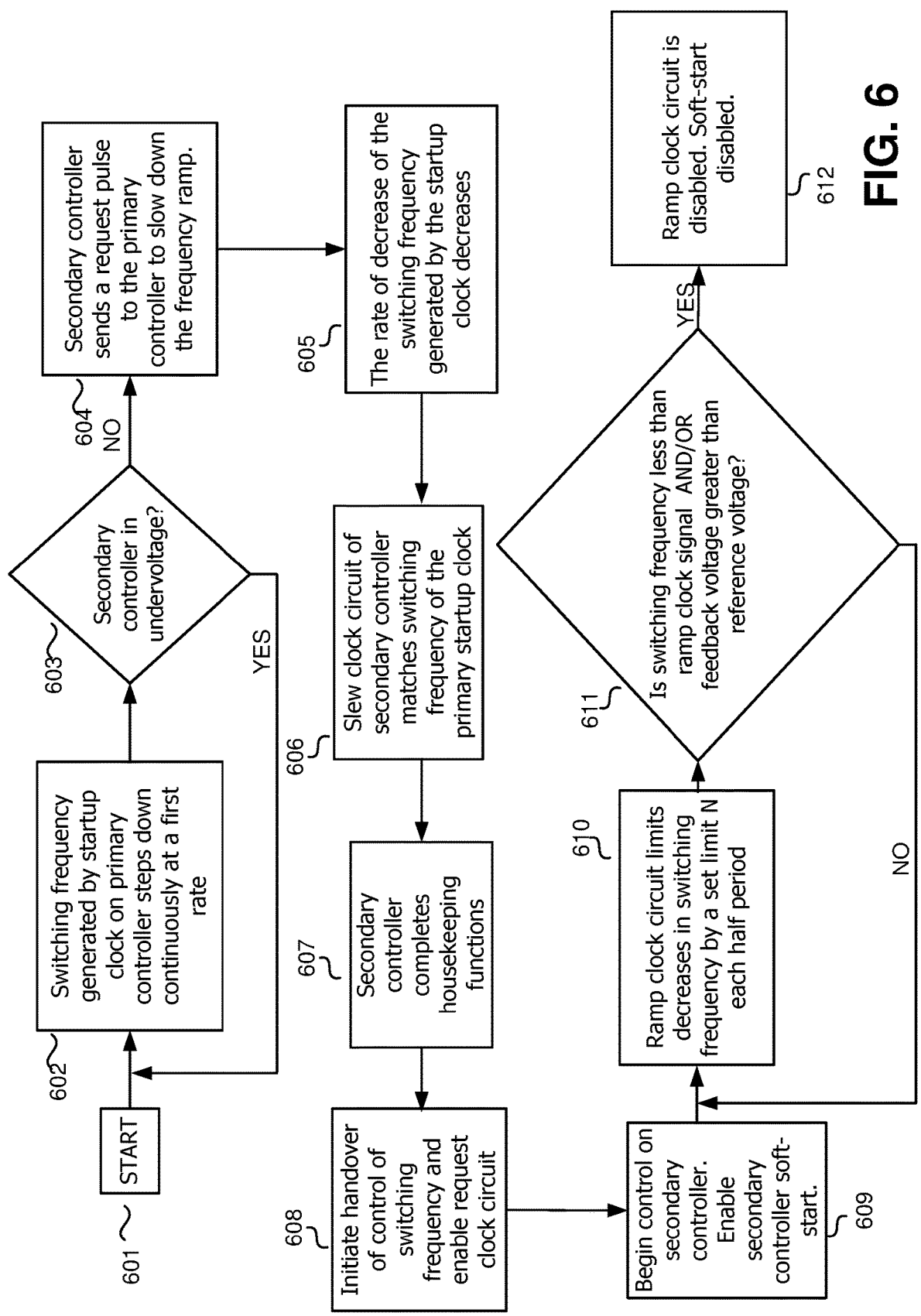
FIG. 6 illustrates an example flow diagram representing one example of transitioning control from a primary controller to a secondary controller at startup in accordance with the teachings of the present invention.

FIG. 6 illustrates an example flow diagram representing one example of transitioning control from a primary controller to a secondary controller at startup in accordance with the teachings of the present invention. A shown, processing begins at process block 601 where it is assumed that the secondary controller is initially in an undervoltage condition, and then at process block 602, the switching frequency generated by startup clock on primary controller steps down sequentially at a first rate to increase the transfer of energy from the input of the power converter to the output of the power converter.

At decision block 603, the secondary controller determines whether it is still in the undervoltage condition. If so, then processing loops back to process block 602. However, if the secondary controller determines that it is no longer in the undervoltage condition in decision block 603, then processing continues to process block 604.

At process block 604, the secondary controller sends a request pulse to indicate to the primary controller to slow down the frequency ramp, and then at process block 605, the rate of decrease of the switching frequency generated by the startup clock of the primary controller is reduced.

At process block 606, the slew clock circuit of the secondary controller matches the switching frequency of the primary startup clock, and then at process block 607, the secondary controller completes any other internal housekeeping functions prior to taking control of generating the switching frequency.

At process block 608, the secondary controller initiates the handover of control of the generation of the switching frequency of a drive signal from the primary controller to the secondary controller by sending synchronization information transmitted in the form of pulses in the request signal to the primary controller, which enables or selects the request clock circuit instead of the startup clock circuit in the primary controller. In this way, the secondary controller controls the switching frequency of the high side switch and the low side switch. At process block 609, the secondary controller begins control and soft-start mode is enabled. At process block 610, the ramp clock circuit limits the decrease of the switching frequency by a set limit N each half period. At decision block 611, the secondary controller checks whether the switching frequency signal is less than a ramp clock signal and the feedback voltage is greater than a reference voltage. In another example of decision block 611, the secondary controller checks whether the switch frequency signal is less than a ramp clock signal or the feedback signal is greater than a reference voltage. If the condition is not true is, processing loops back to process block 610 which indicates that the limit generator of the ramp clock circuit is enabled to continue limiting the decrease the switching frequency by a set limit N each half period. If the condition is true at decision block 611, processing proceeds to process block 612 where the ramp clock circuit is disabled such that the soft-start mode is disabled and normal operation can ensue.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1: A controller configured for use in a power converter, the controller comprising: a multiplexer having a first input coupled to receive a startup clock signal, a second input coupled to receive a request clock signal, and a select input coupled to receive a select signal, wherein the multiplexer is coupled to select the startup clock signal or the request clock signal to generate a clock signal at an output of the multiplexer in response to the select signal; a startup clock configured to generate the startup clock signal to control a switching frequency of a primary switching circuit of the power converter during a startup condition; a request clock configured to generate the request clock signal in response to a request signal to control the switching frequency of the primary switching circuit of the power converter after the startup condition; and a control circuit coupled to receive the clock signal from the multiplexer to generate a drive signal control the switching frequency of the primary switching circuit, the control circuit further configured to generate the select signal to select the startup clock signal during the startup condition, the control circuit further coupled to receive an indication in the request signal of an end of an undervoltage condition, and the control circuit further configured to generate the select signal in response to the request signal to select the request clock signal after the startup condition.

Example 2: The controller of example 1, further comprising a frequency slow down request circuit configured to generate a one time signal coupled to be received by the startup clock in response to the indication in the request signal of the end of the undervoltage condition.

Example 3: The controller of any of the previous examples, wherein the startup clock is configured to decrease the switching frequency of the primary switching circuit of the power converter sequentially at a first rate during the startup condition to increase an output voltage of the power converter, and wherein the startup clock is configured to slow a decrease rate of the switching frequency of the primary switching circuit of the power converter after receiving the one time signal.

Example 4: The controller of any of the previous examples, wherein the control circuit is further coupled to receive initialization information in the request signal after receiving the indication in the request signal of the end of the undervoltage condition, and the control circuit further configured to generate the select signal to select the request signal after receiving the initialization information in the request signal.

Example 5: The controller of any of the previous examples, wherein the request clock is configured to decrease the switching frequency of the primary switching circuit of the power converter in response to the request signal to increase an output voltage of the power converter after the control circuit generates the select signal to select the request clock signal after the startup condition.

Example 6: The controller of any of the previous examples, wherein the primary switching circuit of the power converter comprises a high side switch coupled to a low side switch, wherein the drive signal comprises a high side control signal coupled to drive the high side switch and a low side control signal coupled configured to drive the low side switch.

Example 7: The controller of any of the previous examples, wherein the power converter is a resonant converter, wherein the power converter further comprises a resonant tank circuit including a tank inductance coupled to a tank capacitance coupled to the primary switching circuit.

Example 8: The controller of any of the previous examples, wherein the controller is a primary controller of the power converter, wherein the request signal is configured to be generated by a secondary controller of the power converter, wherein the primary controller is galvanically isolated from the secondary controller, wherein the primary controller is coupled to receive the request signal from the secondary controller to generate the high side control signal to control switching of the high side switch, and the low side control signal to control switching of the low side switch after the startup condition.

Example 9: The controller of any of the previous examples, wherein the secondary controller is coupled to sense the switching frequency of the primary switching circuit to synchronize a switching frequency of the request signal before the control circuit is configured to generate the select signal in response to the request signal to select the request clock signal after the startup condition.

Example 10: The controller of any of the previous examples, wherein the secondary controller is further configured to limit a change in the switching frequency until the switching frequency falls to a half cycle limit and a feedback signal representative of the output of the power converter is greater than a reference voltage.

Example 11: A power converter, comprising: an energy transfer element coupled between an input of the power converter and an output of the power converter; a primary switching circuit coupled to the energy transfer element and the input of the power converter; and a controller configured to control switching of the primary switching circuit to control a transfer of energy from an input of the power converter to the output of the power converter, wherein the controller includes: a multiplexer having a first input coupled to receive a startup clock signal, a second input coupled to receive a request clock signal, and a select input coupled to receive a select signal, wherein the multiplexer is coupled to select the startup clock signal or the request clock signal to generate a clock signal at an output of the multiplexer in response to the select signal;

a startup clock configured to generate the startup clock signal to control a switching frequency of the primary switching circuit during a startup condition;

a request clock configured to generate the request clock signal in response to a request signal to control the switching frequency of the primary switching circuit after the startup condition; and a control circuit configured to control receive the clock signal from the multiplexer to generate a drive signal coupled to the primary switching circuit, the control circuit further configured to generate the select signal to select the startup clock signal during the startup condition, the control circuit is further coupled to receive an indication in the request signal of an end of an undervoltage condition, and the control circuit further configured to generate the select signal in response to the request signal to select the request clock signal after the startup condition.

Example 12: The power converter of example 11, wherein the controller further comprises a frequency slow down request circuit configured to generate a one time signal coupled to be received by the startup clock in response to the indication in the request signal of the end of the undervoltage condition.

Example 13: The power converter of any of the previous examples, wherein the startup clock is configured to decrease the switching frequency of the primary switching circuit of the power converter sequentially at a first rate during the startup condition to increase an output voltage of the power converter, and wherein the startup clock is configured to slow a decrease rate of the switching frequency of the primary switching circuit of the power converter after receiving the one time signal.

Example 14: The power converter of any of the previous examples, wherein the control circuit is further coupled to receive initialization information in the request signal after receiving the indication in the request signal of the end of the undervoltage condition, and wherein the control circuit is configured to generate the select signal to select the request signal after receiving the initialization information in the request signal.

Example 15: The power converter of any of the previous examples, wherein the request clock is configured to decrease the switching frequency of the primary switching circuit of the power converter in response to the request signal to increase an output voltage of the power converter after the control circuit is configured to generate the select signal to select the request clock signal after the startup condition.

Example 16: The power converter of any of the previous examples, wherein the power converter is a resonant power converter, wherein the power converter further comprises a resonant tank circuit including a tank inductance coupled to a tank capacitance coupled to the primary switching circuit, wherein the primary switching circuit comprises a high side switch and a low side switch coupled to the resonant tank circuit, wherein the drive signal includes a high side control signal coupled to drive the high side switch and a low side control signal coupled to drive the low side switch.

Example 17: The power converter of any of the previous examples, wherein the controller is a primary controller of the power converter, wherein the request signal is configured to be generated by a secondary controller of the power converter, wherein the primary controller is galvanically isolated from the secondary controller, wherein the primary controller is coupled to receive the request signal from the secondary controller to generate the high side control signal to control switching of the high side switch, and the low side control signal to control switching of the low side switch after the startup condition.

Example 18: The power converter of any of the previous examples, wherein the secondary controller is to sense the switching frequency of the primary switching circuit to synchronize a switching frequency of the request signal before the control circuit is configured to generate the select signal in response to the request signal to select the request clock signal after the startup condition.

Example 19: A method of controlling a switching of a power converter, comprising: controlling a generation of a switching frequency of a drive signal from a primary controller of the power converter during a startup condition, wherein the drive signal is to control a switching of a primary switching circuit of the power converter; decreasing sequentially at a first rate the switching frequency of the drive signal to increase an output voltage of the power converter; receiving an indication of an end of an undervoltage condition from a secondary controller; slowing a decrease rate of the switching frequency of the drive signal after receiving the indication of the end of the undervoltage condition from the secondary controller; sensing the switching frequency of the drive signal from the secondary controller; synchronizing a switching frequency of a request signal in the secondary controller with the switching frequency of the drive signal generated from the primary controller to prevent a discontinuity in the output voltage of the power converter; and transferring control of the generation of the switching frequency of the drive signal from the primary controller to the secondary controller after synchronizing the switching frequency of the request signal in the secondary controller with the switching frequency of the drive signal generated from the primary controller.

Example 20: The method of example 19, further comprising receiving initialization information from the secondary controller after receiving the indication of the end of the undervoltage condition from the secondary controller and prior to transferring control of the generation of the switching frequency of the drive signal from the primary controller to the secondary controller.

Example 21: The method of any of the previous examples, wherein said decreasing sequentially at the first rate the switching frequency of the drive signal comprises decreasing sequentially the switching frequency of the drive signal at the first rate.

Example 22: The method of any of the previous examples, further comprising decreasing the switching frequency of the drive signal in response to the request signal from the secondary controller to increase an output voltage of the power converter after the startup condition.

Example 23: The method of any of the previous examples, further comprising receiving a command in the request signal from the secondary controller to indicate the end of the undervoltage condition.

Example 24: The method of any of the previous examples, further comprising receiving one or more request signals to receive synchronization information from the secondary controller after synchronizing the switching frequency of the request signal in the secondary controller with the switching frequency of the drive signal generated from the primary controller to initiate a handover of control from the primary controller to the secondary controller to control the generation of the switching frequency of a drive signal.

Example 25: The method of any of the previous examples, enabling a soft-start mode in response to transferring control of the generation of the switching frequency of the drive signal from the primary controller to the secondary controller, wherein the soft-start mode limits a change in the switching frequency by a set limit, wherein the switching frequency does not change for N half cycles, where N can be one or greater than one.

Example 26: The method of any of the previous examples, disabling the soft-start mode in response to the output voltage being above a reference voltage.

Example 27: The method of any of the previous examples, disabling the soft-start mode in response to the switching frequency being greater than a ramp clock frequency.

What is claimed is:

1. A controller configured for use in a power converter, the controller comprising:
   a multiplexer having a first input coupled to receive a startup clock signal, a second input coupled to receive a request clock signal, and a select input coupled to receive a select signal, wherein the multiplexer is coupled to select the startup clock signal or the request clock signal to generate a clock signal at an output of the multiplexer in response to the select signal;
   a startup clock configured to generate the startup clock signal to control a switching frequency of a primary switching circuit of the power converter during a startup condition;
   a request clock configured to generate the request clock signal in response to a request signal to control the switching frequency of the primary switching circuit of the power converter after the startup condition; and
   a control circuit coupled to receive the clock signal from the multiplexer to generate a drive signal control the switching frequency of the primary switching circuit, the control circuit further configured to generate the select signal to select the startup clock signal during the startup condition, the control circuit further coupled to receive an indication in the request signal of an end of an undervoltage condition, and the control circuit further configured to generate the select signal in response to the request signal to select the request clock signal after the startup condition.

2. The controller of claim 1, further comprising a frequency slow down request circuit configured to generate a one time signal coupled to be received by the startup clock in response to the indication in the request signal of the end of the undervoltage condition.

3. The controller of claim 2, wherein the startup clock is configured to decrease the switching frequency of the primary switching circuit of the power converter sequentially at a first rate during the startup condition to increase an output voltage of the power converter, and wherein the startup clock is configured to slow a decrease rate of the switching frequency of the primary switching circuit of the power converter after receiving the one time signal.

4. The controller of claim 1, wherein the control circuit is further coupled to receive initialization information in the request signal after receiving the indication in the request signal of the end of the undervoltage condition, and the control circuit further configured to generate the select signal to select the request signal after receiving the initialization information in the request signal.

5. The controller of claim 1, wherein the request clock is configured to decrease the switching frequency of the primary switching circuit of the power converter in response to the request signal to increase an output voltage of the power converter after the control circuit generates the select signal to select the request clock signal after the startup condition.

6. The controller of claim 1, wherein the primary switching circuit of the power converter comprises a high side switch coupled to a low side switch, wherein the drive signal comprises a high side control signal coupled to drive the high side switch and a low side control signal coupled configured to drive the low side switch.

7. The controller of claim 6, wherein the power converter is a resonant converter, wherein the power converter further comprises a resonant tank circuit including a tank inductance coupled to a tank capacitance coupled to the primary switching circuit.

8. The controller of claim 7, wherein the controller is a primary controller of the power converter, wherein the request signal is configured to be generated by a secondary controller of the power converter, wherein the primary controller is galvanically isolated from the secondary controller, wherein the primary controller is coupled to receive the request signal from the secondary controller to generate the high side control signal to control switching of the high side switch, and the low side control signal to control switching of the low side switch after the startup condition.

9. The controller of claim 8, wherein the secondary controller is coupled to sense the switching frequency of the primary switching circuit to synchronize a switching frequency of the request signal before the control circuit is configured to generate the select signal in response to the request signal to select the request clock signal after the startup condition.

10. The controller of claim 9, wherein the secondary controller is further configured to limit a change in the switching frequency until the switching frequency falls to a half cycle limit and a feedback signal representative of the output of the power converter is greater than a reference voltage.

11. A power converter, comprising:
    an energy transfer element coupled between an input of the power converter and an output of the power converter;
    a primary switching circuit coupled to the energy transfer element and the input of the power converter; and a controller configured to control switching of the primary switching circuit to control a transfer of energy from an input of the power converter to the output of the power converter, wherein the controller includes:
- a multiplexer having a first input coupled to receive a startup clock signal, a second input coupled to receive a request clock signal, and a select input coupled to receive a select signal, wherein the multiplexer is coupled to select the startup clock signal or the request clock signal to generate a clock signal at an output of the multiplexer in response to the select signal;
- a startup clock configured to generate the startup clock signal to control a switching frequency of the primary switching circuit during a startup condition;
- a request clock configured to generate the request clock signal in response to a request signal to control the switching frequency of the primary switching circuit after the startup condition; and
- a control circuit configured to control receive the clock signal from the multiplexer to generate a drive signal coupled to the primary switching circuit, the control circuit further configured to generate the select signal to select the startup clock signal during the startup condition, the control circuit is further coupled to receive an indication in the request signal of an end of an undervoltage condition, and the control circuit further configured to generate the select signal in response to the request signal to select the request clock signal after the startup condition.

12. The power converter of claim 11, wherein the controller further comprises a frequency slow down request circuit configured to generate a one time signal coupled to be received by the startup clock in response to the indication in the request signal of the end of the undervoltage condition.

13. The power converter of claim 12, wherein the startup clock is configured to decrease the switching frequency of the primary switching circuit of the power converter sequentially at a first rate during the startup condition to increase an output voltage of the power converter, and wherein the startup clock is configured to slow a decrease rate of the switching frequency of the primary switching circuit of the power converter after receiving the one time signal.

14. The power converter of claim 11, wherein the control circuit is further coupled to receive initialization information in the request signal after receiving the indication in the request signal of the end of the undervoltage condition, and wherein the control circuit is configured to generate the select signal to select the request signal after receiving the initialization information in the request signal.

15. The power converter of claim 11, wherein the request clock is configured to decrease the switching frequency of the primary switching circuit of the power converter in response to the request signal to increase an output voltage of the power converter after the control circuit is configured to generate the select signal to select the request clock signal after the startup condition.

16. The power converter of claim 11, wherein the power converter is a resonant power converter, wherein the power converter further comprises a resonant tank circuit including a tank inductance coupled to a tank capacitance coupled to the primary switching circuit, wherein the primary switching circuit comprises a high side switch and a low side switch coupled to the resonant tank circuit, wherein the drive signal includes a high side control signal coupled to drive the high side switch and a low side control signal coupled to drive the low side switch.

17. The power converter of claim 16, wherein the controller is a primary controller of the power converter, wherein the request signal is configured to be generated by a secondary controller of the power converter, wherein the primary controller is galvanically isolated from the secondary controller, wherein the primary controller is coupled to receive the request signal from the secondary controller to generate the high side control signal to control switching of the high side switch, and the low side control signal to control switching of the low side switch after the startup condition.

18. The power converter of claim 17, wherein the secondary controller is to sense the switching frequency of the primary switching circuit to synchronize a switching frequency of the request signal before the control circuit is configured to generate the select signal in response to the request signal to select the request clock signal after the startup condition.

19. A method of controlling a switching of a power converter, comprising:
- controlling a generation of a switching frequency of a drive signal from a primary controller of the power converter during a startup condition, wherein the drive signal is to control a switching of a primary switching circuit of the power converter;
- decreasing sequentially at a first rate the switching frequency of the drive signal to increase an output voltage of the power converter;
- receiving an indication of an end of an undervoltage condition from a secondary controller;
- slowing a decrease rate of the switching frequency of the drive signal after receiving the indication of the end of the undervoltage condition from the secondary controller;
- sensing the switching frequency of the drive signal from the secondary controller;
- synchronizing a switching frequency of a request signal in the secondary controller with the switching frequency of the drive signal generated from the primary controller to prevent a discontinuity in the output voltage of the power converter; and
- transferring control of the generation of the switching frequency of the drive signal from the primary controller to the secondary controller after synchronizing the switching frequency of the request signal in the secondary controller with the switching frequency of the drive signal generated from the primary controller.

20. The method of claim 19, further comprising receiving initialization information from the secondary controller after receiving the indication of the end of the undervoltage condition from the secondary controller and prior to transferring control of the generation of the switching frequency of the drive signal from the primary controller to the secondary controller.

21. The method of claim 19, wherein said decreasing sequentially at the first rate the switching frequency of the drive signal comprises decreasing sequentially the switching frequency of the drive signal at the first rate.

22. The method of claim 19, further comprising decreasing the switching frequency of the drive signal in response to the request signal from the secondary controller to increase an output voltage of the power converter after the startup condition.

23. The method of claim 19, further comprising receiving a command in the request signal from the secondary controller to indicate the end of the undervoltage condition.

24. The method of claim 19, further comprising receiving one or more request signals to receive synchronization information from the secondary controller after synchronizing the switching frequency of the request signal in the secondary controller with the switching frequency of the drive signal generated from the primary controller to initiate a handover of control from the primary controller to the secondary controller to control the generation of the switching frequency of a drive signal.

25. The method of claim 19, further comprising:
enabling a soft-start mode in response to transferring control of the generation of the switching frequency of the drive signal from the primary controller to the secondary controller, wherein the soft-start mode limits a change in the switching frequency by a set limit, wherein the switching frequency does not change for N half cycles, where N can be one or greater than one.

26. The method of claim 25, further comprising:
disabling the soft-start mode in response to the output voltage being above a reference voltage.

27. The method of claim 26, further comprising,
disabling the soft-start mode in response to the switching frequency being greater than a ramp clock frequency.

\* \* \* \* \*